April 8, 1924.
T. L. MAY
1,489,264
ADJUSTABLE FASTENER FOR MOTOR CAR STEERING WHEELS
Filed Feb. 27, 1922
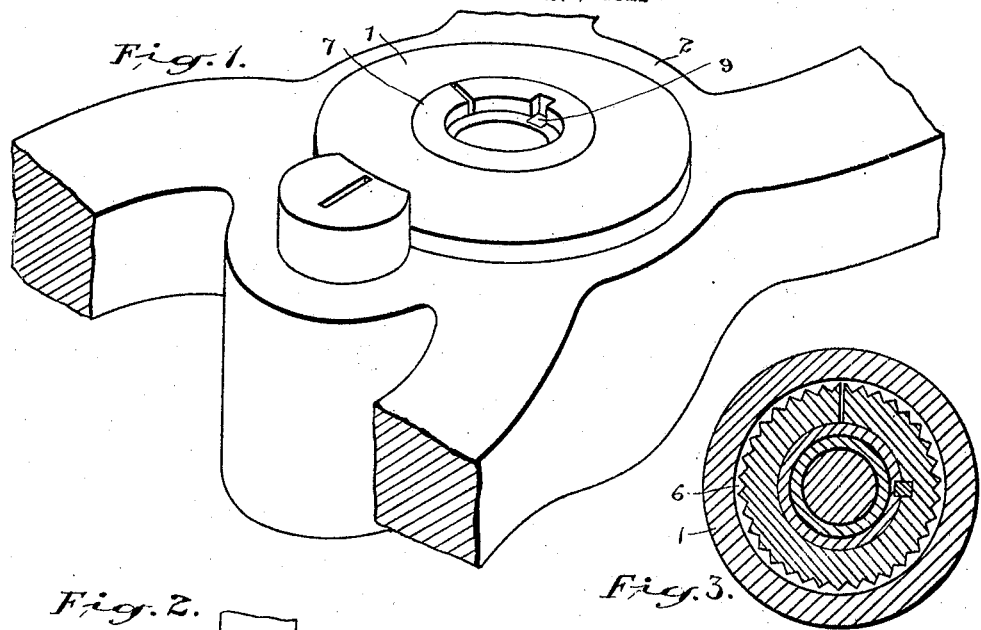
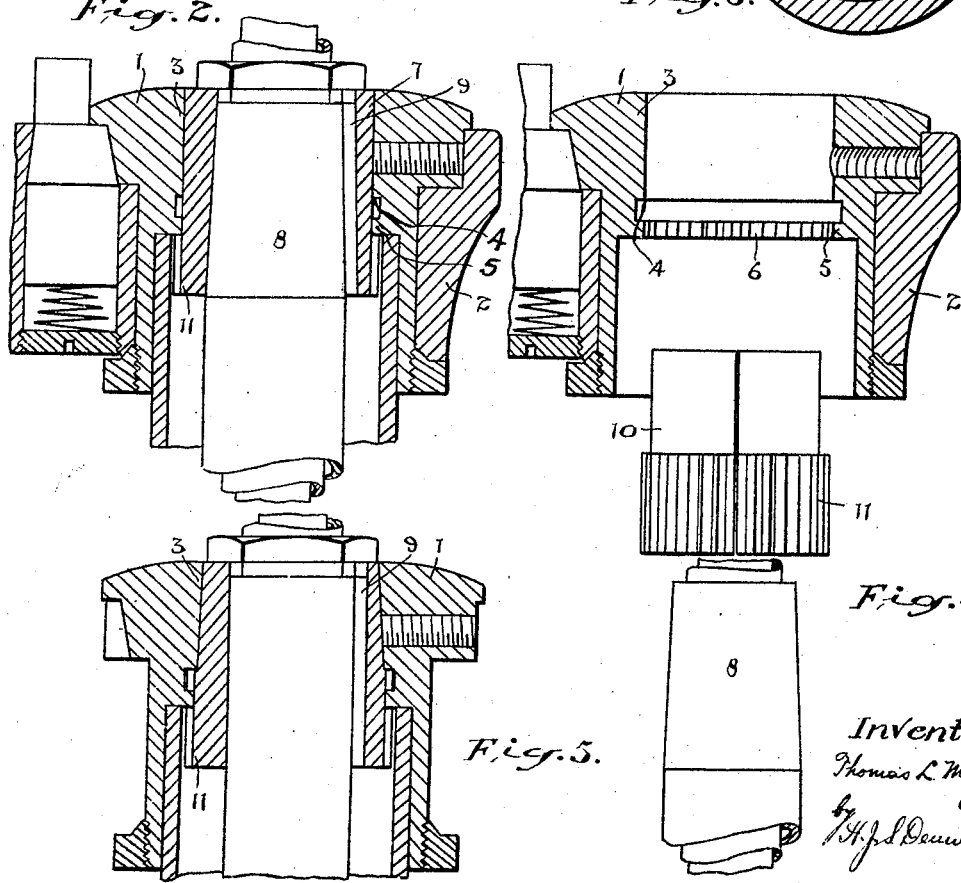
Inventor.
Thomas L. May.

Patented Apr. 8, 1924.

1,489,264

UNITED STATES PATENT OFFICE.

THOMAS L. MAY, OF TORONTO, ONTARIO, CANADA, ASSIGNOR TO JOSEPH WILLIAM McNAB, OF TORONTO, ONTARIO, CANADA.

ADJUSTABLE FASTENER FOR MOTOR-CAR STEERING WHEELS.

Application filed February 27, 1922. Serial No. 539,544.

*To all whom it may concern:*

Be it known that I, THOMAS L. MAY, a subject of the King of Great Britain, and resident of the city of Toronto, county of York, Province of Ontario, in the Dominion of Canada, have invented certain new and useful Improvements in Adjustable Fasteners for Motor-Car Steering Wheels, described in the following specification and illustrated in the accompanying drawings, that form part of the same.

The principal objects of this invention are to facilitate the placing of the steering wheel of a motor car in the most desirable position and to enable the adjustment of the wheel to suit varying adjustments of the steering mechanism.

A further object is to provide a fastening means which will enable the ready removal and replacement of the wheel, and to devise a construction which is particularly adaptable for use with tiltable steering wheels.

The principal feature of the invention consists in providing a bushing for the steering post and a steering wheel head with an interior circumferential surface adapted to interlock with a circumferential surface of the bushing in a multiplicity of positions.

In the drawings, Figure 1 is a perspective view of the top of the hub of a steering wheel, showing the head and bushing in place.

Figure 2 is a vertical sectional view.

Figure 3 is a horizontal sectional view through the interlocking portions of the members.

Figure 4 is a vertical sectional view through the head, the bushing and post being separated therefrom and in relative assembling positions.

Figure 5 is a vertical sectional view showing a slightly modified form of construction.

In the adjustment of steering wheels of motor cars, it is frequently very important that the spokes of the wheels be placed in a certain position in order not to interfere with the operation of the driver of the car in respect to his instrument board and where tiltable wheels are used it is imperative that the wheel be set exactly in a definite position. Frequently the steering gear adjustments are such as to disturb the relative arrangement of the spokes of the wheel. This construction has been devised in order to allow of the desired adjustment.

In the construction illustrated in Figures 1 to 4, the head 1 which is of substantially cylindrical form is secured in the hub 2 of the wheel in any suitable manner. The interior of the head is formed with a cylindrical portion 3 at the top which extends part way through the head to a shoulder 4 and spaced below the shoulder is a flange ring 5, the inner periphery of which is formed with a plurality of regular corrugations, here shown as the V-shaped teeth 6.

A bushing 7 tapered to fit the upper end of the steering post 8 and secured by a suitable key 9 is formed with an upper cylindrical portion 10 which is a snug fit in the portion 3 of the head and the lower end of the bushing is provided with a flange 11 formed with a corrugated periphery adapted to fit snugly into mesh with the teeth 6 of the flange ring 5. These corrugations intermeshing lock the head and bushing securely from relative rotation but it will be readily seen that the wheel may be adjusted by simply slipping these toothed flanges out of mesh and turning to the desired position and immediately locked again. The small teeth allow of a very minute and accurate adjustment and when the head is drawn down it holds the bushing in secure engagement with the post.

The bushing is split longitudinally to enable it to expand upon being pressed tightly into position.

In Figure 5 the construction is precisely the same with the exception that the bushing is tapered externally and provided with a cylindrical bore and the head is tapered to fit the bushing.

It will be seen that with a construction such as described it is possible to obtain very accurate adjustment instantaneously and the range of the adjustment is practically unlimited as the teeth or corrugations may be very fine if desired.

What I claim as my invention is:

1. In a motor car steering wheel, the combination with the steering column having an expansible circumferential corrugated surface, and a wheel hub having an internal circumferential corrugated surface adapted to intermesh with the corrugated surface of the column.

2. In a steering wheel, the combination with the steering column, of a cylindrical bushing keyed to the steering column and having at its lower end longitudinally arranged projecting teeth, and a hub having an internal cylindrical portion to fit over the cylindrical end of said bushing and formed with a toothed peripheral surface adapted to intermesh with the toothed bushing, and a shoulder to engage the upper end of the projecting teeth.

3. In a steering wheel, the combination with the steering column and wheel, of a bushing encircling the steering column and non-rotatively secured thereto and having at its bottom end a circumferential row of teeth projecting therefrom, and a steering head adapted to closely encircle said bushing and having an enlarged recess and within said recess having an internal ring of teeth adapted to mesh with the teeth on said bushing.

THOMAS L. MAY.